US012762292B2

(12) United States Patent
Tang et al.

(10) Patent No.: US 12,762,292 B2
(45) Date of Patent: Oct. 13, 2026

(54) SECURITY ON DIE-TO-DIE INTERCONNECT

(71) Applicant: Altera Corporation, San Jose, CA (US)

(72) Inventors: Lai Guan Tang, Tanjung Bungah (MY); Ankireddy Nalamalpu, Portland, OR (US); Mahesh K. Kumashikar, Bangalore (IN); Atul Maheshwari, Portland, OR (US)

(73) Assignee: Altera Corporation, San Jose, CA (US)

( * ) Notice: Subject to any disclaimer, the term of this patent is extended or adjusted under 35 U.S.C. 154(b) by 881 days.

(21) Appl. No.: 17/711,779

(22) Filed: Apr. 1, 2022

(65) Prior Publication Data

US 2022/0229941 A1 Jul. 21, 2022

(51) Int. Cl.

| | |
|---|---|
| ***G06F 21/85*** | (2013.01) |
| ***G06F 11/07*** | (2006.01) |
| ***G06F 21/60*** | (2013.01) |
| ***G06F 21/78*** | (2013.01) |

(52) U.S. Cl.
CPC .......... *G06F 21/85* (2013.01); *G06F 11/0772* (2013.01); *G06F 21/602* (2013.01); *G06F 21/78* (2013.01)

(58) Field of Classification Search
CPC .................................................... G06F 11/0772
See application file for complete search history.

(56) References Cited

U.S. PATENT DOCUMENTS

2021/0117360 A1* 4/2021 Kutch .................. G06F 3/0656
2023/0289479 A1* 9/2023 Chhabra ................. G06F 21/72

* cited by examiner

*Primary Examiner* — Emmanuel L Moise
*Assistant Examiner* — Xiang Yu
(74) *Attorney, Agent, or Firm* — Fletcher Yoder, P.C.

(57) ABSTRACT

Systems or methods of the present disclosure may provide a semiconductor device including a die of a multi-die package including encryption circuitry to receive data and to encrypt the data to generate encrypted data; and a connection interface to transmit the encrypted data over a die-to-die interconnect to a second die.

20 Claims, 6 Drawing Sheets

SECURITY ON DIE-TO-DIE INTERCONNECT

BACKGROUND

The present disclosure relates generally to die-to-die communications in a multi-die package. More particularly, the present disclosure relates to security measures for communications between the dies of a multi-die package.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

In multi-die packages, there are many die-to-die communications that occur via interconnects between the dies in a package. These communications may be used to accomplish functions of the packages. Due to various features (e.g., debugging features) of some packages, it may be possible for a hacker or other bad actor to access and/or inject data into the communications between the dies within the package using some of these features. These communications may include sensitive data that a user of the multi-die package may wish to protect from such individuals.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present systems and techniques relate to embodiments for securing communications between dies of a multi-die package. For example, in a typical multi-die package, communications between dies may generally be passed easily between the various dies. However, these communications may also be vulnerable to hackers or others who wish to steal or otherwise view sensitive data. Accordingly, a user may wish to protect the data communicated between dies of a multi-die package. To accomplish this, the dies may include encryption and decryption circuitry to encrypt the data as it transfers between dies in the multi-die package and to decrypt the data once received by a die of the multi-die package. Further, it may be inefficient to encrypt all data communications between dies. Accordingly, the dies may be configured to selectively encrypt a portion of data (e.g., sensitive data). To accomplish this, several encryption and decryption strategies may be employed to selectively protect the sensitive data while allowing other data to transfer between dies without being encrypted.

Figure 1:
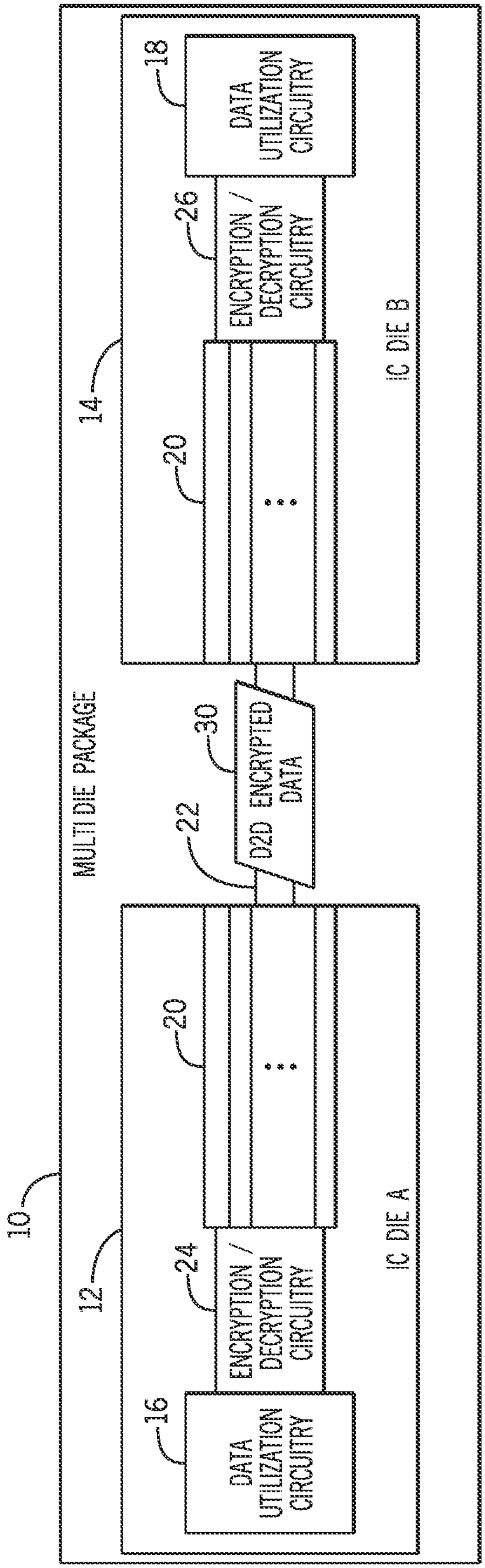
FIG. 1 is a diagram of communications between two dies within a multi-die package, in accordance with an embodiment of the present disclosure.

Keeping the foregoing in mind, FIG. 1 illustrates an example embodiment of a multi-die package 10 including two integrated circuit dies 12 and 14. Each of the dies 12 and 14 may utilize a plurality of channels 20 on a respective connection interface to communicate data 30 between the dies 12 and 14. The dies 12 and 14 may be communicatively coupled through an interconnect 22, through which the channels 20 may transmit and receive the data 30 between the dies 12 and 14. In some embodiments, the interconnect 22 may be an embedded bridge, such as an embedded multi-die interconnection bridge (EMIB). However, the interconnect 22 may be any manner of connectors for communicatively connecting the dies 12 and 14. For example, in some embodiments, the interconnect 22 may be a wire bond between the dies 12 and 14, through silicon vias (TSVs) dispersed through a silicon interposer, or any other appropriate means of communicatively connecting the dies 12 and 14. Further, the dies 12 and 14 may include data utilization circuitry 16 and 18 that is used to perform functions using the data. For instance, the data utilization circuitry 16 and 18 may read/write data to/from memory, process data using processing cores and/or programmable circuitry, transmit/receive data off package, or utilize the data in another manner suitable for the multi-die package 10. Additionally, the dies 12 and 14 may include encryption and decryption circuitries 24 and 26, respectively. The encryption and decryption circuitries 24 and 26 may be used to selectively encrypt the data 30.

The dies 12 and 14 may, in some embodiments, be chiplets or integrated circuits in the multi-die package 10. For example, in some embodiments, the dies 12 and 14 may be any type of processor, such as a central processing unit (CPU), circuitry used to implement an intelligence processing unit (IPU), a XEON® processor from Intel Corporation, an Advanced RISC Machines (ARM)-based processor, or any other processor. Furthermore, the dies 12 and 14 may include one or more application-specific integrated circuits (ASICS), programmable logic circuitry (e.g., a field-programmable gate array), memory storage circuitry (e.g., a memory host controller), transceiver circuitry, and the like. Further, the dies 12 and 14 may include any circuitry suitable to perform functions that may be beneficial to a system including the multi-die package 10, such as processing functions, memory storage, or any other appropriate function.

Further, the data utilization circuitry 16 may be any appropriate processor, memory device, or other circuitry in the die 12 that may use the data 30. For example, in some embodiments, the data utilization circuitry 16 may be a FPGA, ASIC, microprocessor, or any other type of processor. Further, the data utilization circuitry 16 may be random access memory (RAM), flash memory, or any other circuitry that may use or store the data 30. In some embodiments, the data utilization circuitry 16 may send instructions to the encryption and decryption circuitry 24 to direct the performance of the encryption and decryption circuitry 24 to transmit encrypted data 30 via the channels 20. For example, in some embodiments, the data utilization circuitry 16 may access and add the instructions to the metadata field 32 of the data 30.

Keeping the foregoing in mind, in some embodiments, the data may be in a freely readable state while transferring between the dies 12 and 14 with the multi-die package 10. For example, the data 30 may not be encrypted and may be readable by hackers or other bad actors who may gain access to bits on the interconnect between the dies 12 and 14 within the package. Historically, in-package security has not been an issue due to the integrated nature of such packages. However, in some embodiments, the multi-die package 10 may include debugging capabilities or other capabilities that a bad actor may repurpose for reading the data. Moreover, due at least in part to the growth of chiplet prevalence in integrated circuit design, as compared to other designs such as system-on-chip (SoC), bad actors may have an increased motivation to read inter-die communications within a multi-die package.

Accordingly, in some embodiments, the multi-die package 10 may include protective measures to secure the data as die-to-die encrypted data 30 ("data 30") as it is transferred between the dies 12 and 14 via the interconnect 22. For example, in some embodiments, the dies 12 and 14 may be configured to encrypt and decrypt data. For example, in some embodiments, the die 12 may encrypt the data 30 to be transferred to the die 14 via the interconnect 22. The die 14 may receive the encrypted data 30 from the interconnect 22 and decrypt it for use within the die 14. Similarly, the die 14 may perform encryption operations on the data 30 for the die 12 to decrypt. Accordingly, in some embodiments, the dies 12 and 14 may be configured to encrypt and decrypt the data 30 via encryption and decryption circuitries 24 and 26, respectively. For example, the die 12 may include the encryption and decryption circuitry 24, and the die 14 may include the encryption and decryption circuitry 26. Further, although only two dies (i.e., the dies 12 and 14) are discussed, any number of dies that communicate in a multi-die package may similarly protect data 30 in intra-package communications according to the present disclosure.

Keeping the foregoing in mind, in some embodiments, in may be desirable to encrypt some or all of the data 30 transferred between the two dies 12 and 14. For example, in some embodiments, one of the dies 12 and 14 may be a custom chip provided by a third party. The third party may desire to keep the operations of the custom chip secret. Accordingly, the third party may desire for the data 30 communicated to or from the custom chip to be encrypted to prevent bad actors from reading the data 30 to learn details about the custom chip. Additionally, in some embodiments, a user of the multi-die package 10 may desire that certain types of the data 30 be encrypted while other types be allowed to transmit between the dies 12 and 14 without being encrypted. For example, in some embodiments, the data 30 may be related to partitioned functions that are partially performed by each of the dies 12 and 14. Indeed, the data 30 communicated between the dies 12 and 14 containing partial results of the functions of the dies 12 and 14 may be sensitive. As another non-limiting example, in some embodiments, a plain-text conversion of system designs in an FPGA may be transmitted between the dies 12 and 14, which may also be highly sensitive data. Additionally or alternatively, the data 30 may be other types of data, such as communications within a control plane in an infrastructure processing unit (IPU), machine learning engine structure data, or user configuration images. As another example, the data 30 may include user data such as browsing history, custom settings in software, Ethernet data, streaming data, or any other user data. Because the data 30 may vastly differ in purpose and in sensitivity, it may be desirable to protect sensitive data from bad actors while leaving less sensitive data unprotected.

Further, within each type, certain portions of the data 30 may be sensitive. For example, in an example embodiment where the data 30 is streaming data from the Internet, the sensitivity of the data 30 may be determined by the content of the data 30, such as confidential data, rather than just the type of data (e.g., streamed data). Further, the data 30 may be selectively deemed sensitive depending on various circumstances. For example, internet search data, Ethernet data, and other types of data may not ordinarily be sensitive data. Nevertheless, at least some parts of such data may be indicated as such depending on various circumstances or factors, such as content itself or jurisdictions where data is processed.

Figure 2:
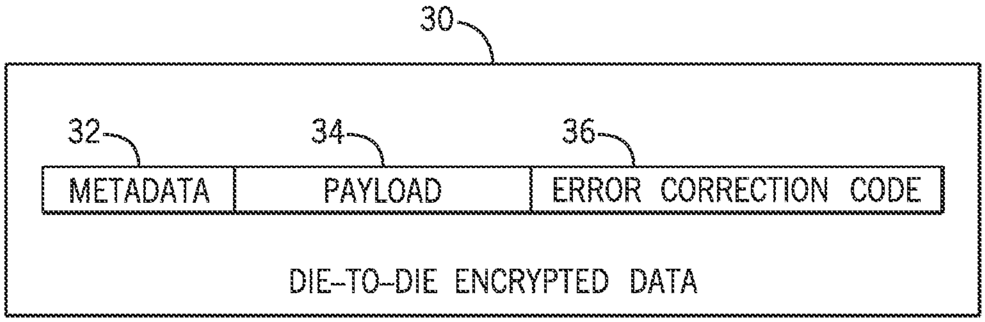
FIG. 2 is a block diagram of encrypted data communicated between the two dies of FIG. 1, in accordance with an embodiment of the present disclosure.

Keeping the foregoing in mind, FIG. 2 illustrates an example embodiment of a packet of the data 30. The data 30 may include one or more packets of series of bits that describe features of the data 30. For example, the packet of the data 30 may include a metadata field 32 having a first number of bits. The bits of the metadata field 32 may indicate whether the data 30 is to be encrypted by the encryption and decryption circuitries 24 and 26, as well as other features categorizing the portion of the data 30 in the respective packet. The packet of the data 30 may also include a payload field 34 that may include the portion of the data 30 that may be utilized by the data utilization circuitry 16 and 18. Further, the packet of the data 30 may include an error correction code field 36 that may be used to determine and/or correct transmission errors in the payload field 34. In some embodiments, the error correction code field 36 may be utilized by integrity check circuitry of the dies 12 and 14.

For example, in some embodiments, a user of the multi-die package 10 may desire to specify which data 30 to encrypt, how to encrypt the data 30, which of the channels 20 should encrypt and transmit the data 30, and so forth. Accordingly, the user may include in the metadata field 32 said specifications (e.g., encryption bit flags) for the data 30 that is determined to be sensitive. Further, other methods of indicating said specifications may also be used. In some embodiments, the metadata field 32 may include a control signal separate from the packet that may be provided by the dies 12 and 14 to indicate to the encryption and decryption circuitries 24 and 26 how to encrypt the sensitive data 30. Further, the metadata field 32 or other control signals for less-sensitive data 30 may indicate to the encryption and decryption circuitries 24 and 26 that the less-sensitive data 30 is not to be encrypted.

Further, in some embodiments, the metadata field 32 may indicate when the data 30 should and should not be encrypted across a channel of the interconnect 22. For example, large volumes of data 30 may be transmitted between the dies 12 and 14. Accordingly, the metadata field 32 may be used to toggle activation/deactivation of the encryption and decryption circuitries 24 and 26 for encrypting or decrypting the data 30. For example, the metadata field 32 of a first packet may indicate that its payload field 34 should be encrypted while the metadata field 32 of a second packet may indicate that its payload field 34 should not be encrypted. This toggling may be even be performed when the first and second packets are both sent over the same interconnect 22 between the same dies 12 and 14. In fact, this time division of encryption/decryption may also occur when both the first and second packets use the same channel of the same interconnect.

The metadata field 32 or separate control signals may also indicate to the encryption and decryption circuitries 24 and 26 when a payload field 34 of incoming data 30 is to be decrypted. If encrypted data is not decrypted before use, the encrypted data 30 may negatively impact the operation of the dies 12 and 14. Accordingly, the encryption and decryption circuitries 24 and 26 are to be aware of when the data 30 is encrypted, how to decrypt it, and so forth.

In some embodiments, the user may be able to flag their own data with encryption flags that change the metadata field 32 and/or control signals. In other words, the encryption/decryption of data may be user driven. Using such control, the user may opt to encrypt all data 30 transferred between the dies 12 and 14. It should be noted, however, that selecting to encrypt sensitive data 30 and not encrypt other less-sensitive data 30 may reduce the power consumption, processing resource consumption, heat generation, and/or processing speed within the multi-die package 10. In some embodiments, the user may consider the trade-off between security and power savings when determining how much of the data 30 to encrypt.

Figure 3:
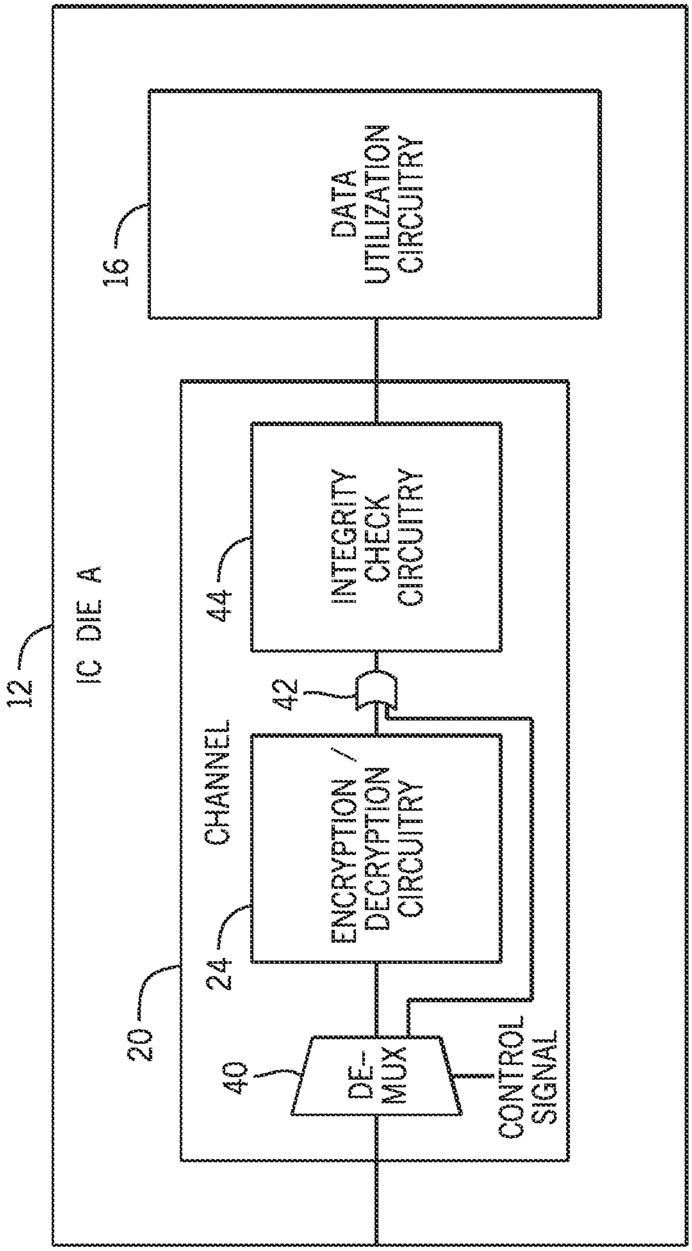
FIG. 3 is a diagram of one of the dies of FIG. 1, in accordance with an embodiment of the present disclosure.

Turning now to FIG. 3, the die 12 may utilize a number of the channels 20 as well as the data utilization circuitry 16. The illustrated example of FIG. 3 shows a single channel 20, although there may be any appropriate number of channels 20 between the die 12 and other die (e.g., the die 14) in the multi-die package 10. Indeed, some or all of the channels 20 may include dedicated encryption and decryption circuitry 24 to independently drive the respective channels 20. Further, although only features of the die 12 are included in this discussion, the die 14 and its respective circuitries may perform identical or similar functions.

To protect the sensitive data 30, the encryption and decryption circuitry 24 may perform any appropriate encryption method. For example, in embodiments where certain data 30 may more sensitive than others, different levels of encryption may be applied to the data 30 accordingly. For example, highly sensitive data 30 may be fully encrypted with robust encryption methods. Additionally or alternatively, data 30 that is less sensitive may be encrypted with a simpler, less power-intensive encryption method, such as lower power scrambling/descrambling encryption methods. Therefore, it may be possible to retain some of the power conservations described previously by applying differing levels of encryption on data 30 that has different levels of sensitivity.

In some embodiments, the channels 20 may include bypass circuitry to employ time division techniques to convey both encrypted and non-encrypted data 30 between the dies 12 and 14 over the respective channel 20 at different times. For example, in the illustrated channel 20 of FIG. 3, the bypass circuitry may include a de-mux 40 to receive the data 30 received by the die 12 to selectively output the data 30 to the encryption and decryption circuitry 24 or to an OR gate 42. The OR gate 42 receives data from the encryption and decryption circuitry 24 or the de-mux 40 directly. Whichever route the data 30 takes, the OR gate 42 routes it to the integrity check circuitry 44. For example, the de-mux 40 may receive a control signal to indicate whether the payload of a packet of data 30 is encrypted and should be decrypted by the encryption and decryption circuitry 24. In some embodiments, the encryption and decryption circuitry 24 may include I/O pins to connect to the channels 20, the bypass circuitry, and the integrity check circuitry 44. For example, in some embodiments, the control signal may be included in and/or derived from the metadata field 32. For example, data from defined bit(s) of the metadata field 32 may be transmitted to the de-mux 40. From the de-mux 40, the data 30 may selectively pass through the encryption and decryption circuitry 24 to be decrypted and routed to the integrity check circuitry 44 via the OR gate 42. Alternatively, the data 30 may bypass the encryption and decryption circuitry 24 and be routed directly to the integrity check circuitry 44 via the OR gate 42.

Further, although the illustrated embodiment shows the de-mux 40 and the OR gate 42 (i.e., the bypass circuitry) selectively routing the received data 30 through the encryption and decryption 24, the bypass circuitry may also be used to bypass encryption for transmissions between die. For example, in some embodiments, the bypass circuitry may be configured to selectively route the data 30 from the data utilization circuitry 16 (e.g., via the integrity check circuitry 44) around the encryption and decryption circuitry 24 while the data 30 is also transmitted to the encryption and decryption circuitry 24. The de-mux 40 may be supplemented by multiplexing circuitry to select whether to bypass the encryption and decryption circuitry 24 or to utilize the encrypted data for transmission to the die 14. In some embodiments, the encryption and decryption circuitry 24 may also receive the control signal. When the control signal indicates no encryption or decryption, the encryption and decryption circuitry 24 does not perform encryption or decryption in addition to whether the data 30 should bypass the encryption and decryption 24 via the de-mux 40 and OR gate 42.

The bypass circuitry may provide opportunities for time division techniques. For instance, encryption and communication of encrypted data may be rate capped. For example, in some embodiments, the encryption and decryption circuitry 24 may encrypt sensitive data 30 only for a percentage (e.g., 50%, 60%, 70%, 80%, 90%, etc.) of clock cycles. During other cycles, the less-sensitive data 30 may be transferred through the channels 20 without being encrypted, for example, via the bypass circuitry (i.e., the de-mux 40 and the OR gate 42).

In an example embodiment of the time division techniques described, there may be a total of 64 channels 20, wherein 4 of the channels 20 may be designated to encrypt sensitive data 30 most or all of the time. Further, the remaining channels 20 may transfer less-sensitive data 30.

Accordingly, the remaining channels 20 may encrypt the less-sensitive data 30 a fraction of the time, for example every 10 cycles. In this manner, there may be a compromise between power conservation (i.e., by not encrypting all of the data 30) and security (i.e., by both encrypting the sensitive data 30 most/all of the time and encrypting the less-sensitive data 30 a portion of the time). It should be noted that this example is intended to be illustrative only and that any variation of the described embodiment is within the scope of this disclosure.

The integrity check circuitry 44 may ensure that the data 30 sent from the encryption and decryption circuitry 24 to the data utilization circuitry 16 is accurate. For example, the integrity check circuitry 44 may receive the error correction code field 36 of the data 30 to determine the accuracy of the payload field 34 or any portion of data from the data 30. Accordingly, the integrity check circuitry 44 may include a number of circuits to accomplish this. For example, in some embodiments, the integrity check may utilize FIFO circuitry to store and control the flow of the data 30 sent from the encryption and decryption circuitry 24 to the data utilization circuitry 16 while performing the integrity check. Further, the integrity check circuitry 44 may include circuitry to evaluate a checksum of the error correction code field 36. Additionally or alternatively, the integrity check circuitry 44 may include a CRC circuit to detect errors in the data sent to the data utilization circuitry 16. In some embodiments, there may be additional circuitry in the integrity check circuitry 44 to ensure a smooth and accurate transmission of data from the encryption and decryption circuitry 24 to the data utilization circuitry 16.

It should be noted that the description of the circuitries in the die 12 as shown in FIG. 3 may also be applicable to the circuitries in the die 14. Indeed, the encryption and decryption circuitry 26 and the data utilization circuitry 18 may operate similarly to the encryption and decryption circuitry 24 and the data utilization circuitry 16, respectively.

Figure 4:
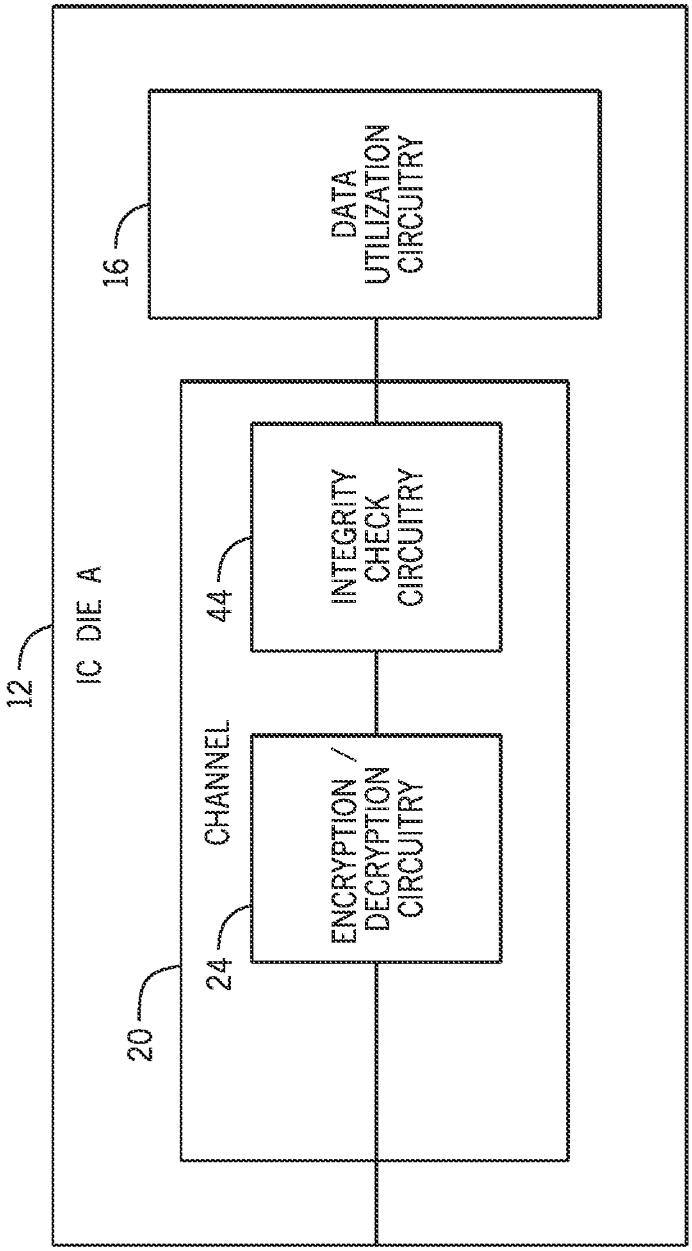
FIG. 4 is a diagram of one of the dies of FIG. 1, in accordance with an embodiment of the present disclosure.

Turning now to FIG. 4, in some embodiments, at least some of the channels 20 may not have the bypass circuitry (i.e., the de-mux 40 and the OR gate 42) present in the channel 20 as seen in FIG. 3. For example, in some embodiments, the bypass circuitry may be incorporated within the encryption and decryption circuitry 24, such that the encryption and decryption circuitry 24 may receive a control signal such as the metadata field 32 to determine when the received data 30 should be encrypted/decrypted or not. In such embodiments, the unencrypted data is selectively passed through the encryption and decryption circuitry 24 when disabled. Further, in some embodiments, one or more of the channels 20 may be permanently configured to encrypt the data 30. Accordingly, some of the channels 20 may not include any bypass circuitry. In some embodiments, the channels 20 may include a mix of dedicated channels without bypass circuitry and flexible channels with bypass circuitry. Furthermore, in some embodiments, at least some of the channels may be dedicated unencrypted channels that have no encryption and decryption circuitry 24 while other channels do include the encryption and decryption circuitry 24.

Figure 5:
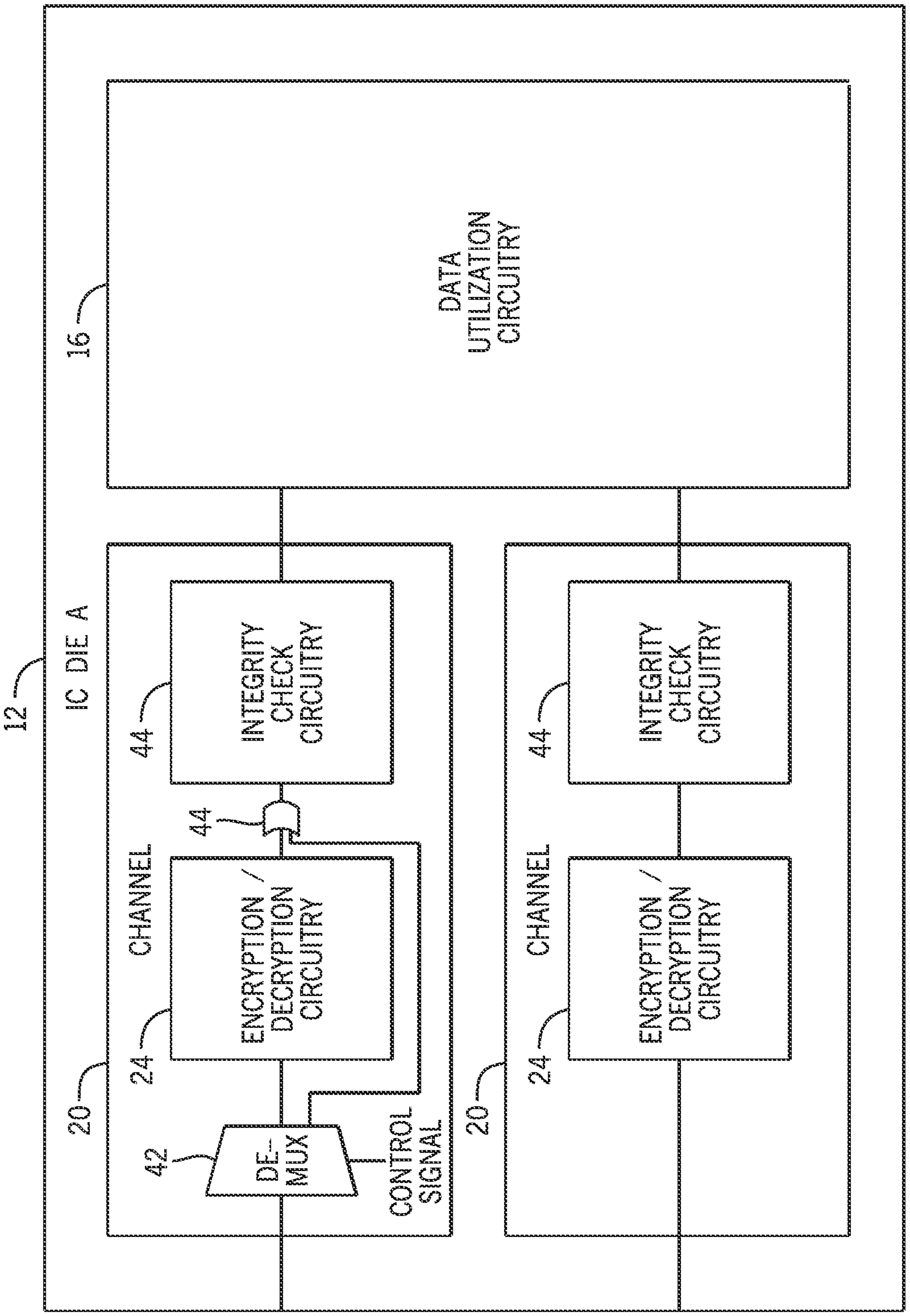
FIG. 5 is a diagram of two channels of one of the dies of FIG. 1, in accordance with an embodiment of the present disclosure.

FIG. 5 illustrates an example embodiment of two of the channels 20 with one channel flexible and the other dedicated with respect to encryption. For example, one of the channels 20 may include the bypass circuitry (i.e., the de-mux 40 and the OR gate 42) while another may not. Further, any number of the channels 20 may have either configuration. In some embodiments, this flexibility may allow for the data 30 to be transferred between the dies 12 and 14 in a number of ways. Indeed, some of the channels 20 may omit the encryption and decryption circuitry 24 entirely.

For example, a select number of the channels 20 may be utilized to encrypt, transmit, receive, and decrypt the sensitive data 30, while other channels 20 may transmit the less-sensitive data 30 without utilizing the encryption and decryption circuitry 24. For example, the bypass circuitry may be utilized by the channels 20 configured to transmit the less-sensitive data 30. Further, in some embodiments, some of the channels 20 may not have the encryption and decryption circuitry 24 at all. For example, some channels 20 may be permanently set to transmit less-sensitive data 30 and may not include the encryption and decryption circuitry 24.

However, it may be desirable to have the encryption and decryption circuitry 24 included on several or all of the channels 20. For example, in some embodiments, the channels 20 designated to receive and encrypt the sensitive data 30 may change dynamically. Accordingly, in some embodiments, the channels 20 designated to transmit less-sensitive data 30 may still include the encryption and decryption circuitry 24. In some embodiments, the channels 20 designated to transmit the sensitive data 30 may be ½, ¼, ⅛, 1/16, 1/32 of the total number of the channels 20, or any other appropriate number of the channels 20. Indeed, in some embodiments, all of the data 30 may be sensitive. Accordingly, all of the channels 20 may be designated to transmit the sensitive data 30. Further, by designating a small number of the channels 20 to encrypt the data, power consumption may be reduced (i.e., by reducing the number of the channels 20 that are encrypting/decrypting the data 30).

The channels 20 may be any number of appropriate channels. For example, there may be 1, 2, 4, 8, 16, 32, 64, 128, or any other appropriate number of channels 20 on the connection interfaces of the dies 12 and 14. In some embodiments, a large number of channels 20 may be used to accommodate the communications between the dies 12 and 14 when the interconnect 22 is wide.

In some embodiments, some of the channels 20 may communicate the data 30 in a unilateral direction, while other channels 20 may communicate the data 30 in an opposite unilateral direction. For example, approximately half of the channels 20 may be oriented to direct the data 30 from one of the respective dies 12, 14 to the other, while the other half of the channels 20 may be oriented to direct data in the opposite direction. However, in some embodiments, some or all of the channels 20 may be bi-directional, such that the data 30 may flow from one of the dies 12, 14 to the other through any of the bi-directional channels 20. It should be noted that any number of the channels 20 may unilateral in either direction or bi-directional, and the examples described are not intended to be limiting.

Figure 6:
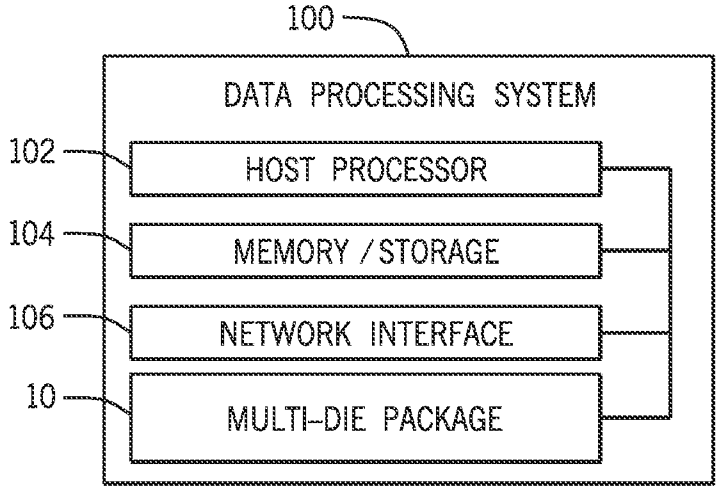
FIG. 6 is a block diagram of a data processing system including a processor with an integrated programmable fabric unit, in accordance with an embodiment of the present disclosure.

Keeping the foregoing in mind, the multi-die package 10 may be a part of a data processing system or may be a component of a data processing system that may benefit from use of the techniques discussed herein. For example, the multi-die package 10 may be a component of a data processing system 100, shown in FIG. 6. The data processing system 100 includes a host processor 102, memory and/or storage circuitry 104, and a network interface 106. The data processing system 100 may include more or fewer components (e.g., electronic display, user interface structures, application specific integrated circuits (ASICs)). In some embodiments, one or more of the components may be included inside of the multi-die package 10. For instance, at least a portion of the host processor 102, at least a portion of the memory and/or storage circuitry 104, and/or at least a portion of the network interface 106 may be implemented using the die in the multi-die package 10.

The host processor 102 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 100 (e.g., to perform machine learning, video processing, voice recognition, image recognition, data compression, database search ranking, bioinformatics, network security pattern identification, spatial navigation, or the like). In some embodiments, the host processor 102 may be the processing circuitry 90, as illustrated in FIG. 5. The memory and/or storage circuitry 104 may include random access memory (RAM), read-only memory (ROM), one or more hard drives, flash memory, or the like. The memory and/or storage circuitry 104 may be considered external memory to the multi-die package 10 and may hold data to be processed by the data processing system 100 and/or may be internal to the multi-die package 10. In some cases, the memory and/or storage circuitry 104 may also store configuration programs (e.g., bitstream) for programming a programmable fabric of the multi-die package 10. The network interface 106 may permit the data processing system 100 to communicate with other electronic devices. The data processing system 100 may include several different packages or may be contained within a single package on a single package substrate.

In one example, the data processing system 100 may be part of a data center that processes a variety of different requests. For instance, the data processing system 100 may receive a data processing request via the network interface 106 to perform machine learning, video processing, voice recognition, image recognition, data compression, database search ranking, bioinformatics, network security pattern identification, spatial navigation, or some other specialized task. The host processor 102 may cause a programmable logic fabric of the multi-die package 10 to be programmed with a particular accelerator related to requested task. For instance, the host processor 102 may instruct that configuration data (bitstream) be stored on the memory and/or storage circuitry 104 or cached in sector-aligned memory of the multi-die package 10 to be programmed into the programmable logic fabric of the multi-die package 10. The configuration data (bitstream) may represent a circuit design for a particular accelerator function relevant to the requested task.

The processes and devices of this disclosure may be incorporated into any suitable circuit. For example, the processes and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiments

EXAMPLE EMBODIMENT 1. A semiconductor device comprising: a multi-die package comprising: a first die comprising: first encryption circuitry to receive data and to encrypt the data to generate encrypted data; and a first connection interface to transmit the encrypted data over a die-to-die interconnect; the die-to-die interconnect; and a second die comprising: a second connection interface to receive the encrypted data from the first die via the die-to-die interconnect; and second encryption circuitry to receive the encrypted data and to decrypt the encrypted data to generate decrypted data.

EXAMPLE EMBODIMENT 2. The semiconductor device of example embodiment 1, wherein the second encryption circuitry is to receive additional data and to encrypt the additional data to generate additional encrypted data.

EXAMPLE EMBODIMENT 3. The semiconductor device of example embodiment 2, wherein the second connection interface is to transmit the additional encrypted data.

EXAMPLE EMBODIMENT 4. The semiconductor device of example embodiment 3, wherein the first connection interface is to receive the additional encrypted data over the die-to-die interconnect.

EXAMPLE EMBODIMENT 5. The semiconductor device of example embodiment 4, wherein the first encryption circuitry is to decrypt the additional encrypted data to generate additional decrypted data.

EXAMPLE EMBODIMENT 6. The semiconductor device of example embodiment 1, wherein the second die comprises data utilization circuitry to use the decrypted data.

EXAMPLE EMBODIMENT 7. The semiconductor device of example embodiment 6, wherein the data utilization circuitry comprises a processor or a field-programmable gate array.

EXAMPLE EMBODIMENT 8. The semiconductor device of example embodiment 1, wherein the first encryption circuitry does not encrypt at least some subsequent data transmitted from the first die over the die-to-die interconnect.

EXAMPLE EMBODIMENT 9. The semiconductor device of example embodiment 8, wherein the first encryption circuitry is to encrypt the encrypted data and to not encrypt the at least some subsequent data based on a control signal.

EXAMPLE EMBODIMENT 10. The semiconductor device of example embodiment 9, wherein the control signal is based at least in part on respective values for a user flag in the data and the at least some subsequent data.

EXAMPLE EMBODIMENT 11. The semiconductor device of example embodiment 8, wherein the first die comprises bypass circuitry to cause the at least some subsequent data to bypass the first encryption circuitry.

EXAMPLE EMBODIMENT 12. The semiconductor device of example embodiment 1, wherein the first connection interface comprises a first plurality of channels, and wherein the second connection interface comprises a second plurality of channels.

EXAMPLE EMBODIMENT 13. The semiconductor device of example embodiment 12, wherein at least one or more channels of the first plurality of channels comprise encryption circuitry to encrypt data, decrypt data, or both.

EXAMPLE EMBODIMENT 14. The semiconductor device of example embodiment 13, wherein encryption or decryption operations of the one or more channels of the first plurality of channels are driven independently of each other.

EXAMPLE EMBODIMENT 15. The semiconductor device of example embodiment 1, wherein a clock frequency of encryption is a fraction of a frequency of unencrypted data transfer.

EXAMPLE EMBODIMENT 16. A semiconductor device comprising: a die of a multi-die package comprising: encryption circuitry to receive data and to encrypt the data to generate encrypted data; and a connection interface to transmit the encrypted data over a die-to-die interconnect to a second die within the multi-die package.

EXAMPLE EMBODIMENT 17. The semiconductor device of example embodiment 16, wherein the encryption circuitry is to encrypt the data based on metadata of a packet of the data.

EXAMPLE EMBODIMENT 18. The semiconductor device of example embodiment 16, wherein the connection interface comprises a plurality of channels, and wherein the encrypted data is transmitted over the die-to-die interconnect by one of the plurality of channels, and wherein unencrypted data is transmitted over the die-to-die interconnect by a remainder of the plurality of channels.

EXAMPLE EMBODIMENT 19. A semiconductor device comprising: a die of a multi-die package comprising: a connection interface to receive encrypted data from a second die of the multi-die package via a die-to-die interconnect; decryption circuitry to receive the encrypted data and to decrypt the encrypted data to generate decrypted data; and data utilization circuitry to utilize the decrypted data.

EXAMPLE EMBODIMENT 20. The semiconductor device of example embodiment 19, wherein the data utilization circuitry comprises a processor to receive the decrypted data from the decryption circuitry.

What is claimed is:

1. A semiconductor device comprising:
 a multi-die package comprising:
  a first die comprising:
   first encryption circuitry to receive data and to encrypt the data to generate encrypted data; and
   a first connection interface to transmit the encrypted data over a die-to-die interconnect;
  the die-to-die interconnect; and
  a second die comprising:
   a second connection interface to receive the encrypted data from the first die via the die-to-die interconnect; and
   second encryption circuitry to receive the encrypted data and to decrypt the encrypted data to generate decrypted data.

2. The semiconductor device of claim 1, wherein the second encryption circuitry is to receive additional data and to encrypt the additional data to generate additional encrypted data.

3. The semiconductor device of claim 2, wherein the second connection interface is to transmit the additional encrypted data.

4. The semiconductor device of claim 3, wherein the first connection interface is to receive the additional encrypted data over the die-to-die interconnect.

5. The semiconductor device of claim 4, wherein the first encryption circuitry is to decrypt the additional encrypted data to generate additional decrypted data.

6. The semiconductor device of claim 1, wherein the second die comprises data utilization circuitry to use the decrypted data.

7. The semiconductor device of claim 6, wherein the data utilization circuitry comprises a processor or a field-programmable gate array.

8. The semiconductor device of claim 1, wherein the first encryption circuitry does not encrypt at least some subsequent data transmitted from the first die over the die-to-die interconnect.

9. The semiconductor device of claim 8, wherein the first encryption circuitry is to encrypt the encrypted data and to not encrypt the at least some subsequent data based on a control signal.

10. The semiconductor device of claim 9, wherein the control signal is based at least in part on respective values for a user flag in the data and the at least some subsequent data.

11. The semiconductor device of claim 8, wherein the first die comprises bypass circuitry to cause the at least some subsequent data to bypass the first encryption circuitry.

12. The semiconductor device of claim 1, wherein the first connection interface comprises a first plurality of channels, and wherein the second connection interface comprises a second plurality of channels.

13. The semiconductor device of claim 12, wherein at least one or more channels of the first plurality of channels comprise encryption circuitry to encrypt data, decrypt data, or both.

14. The semiconductor device of claim 13, wherein encryption or decryption operations of the one or more channels of the first plurality of channels are driven independently of each other.

15. The semiconductor device of claim 1, wherein a clock frequency of encryption is a fraction of a frequency of unencrypted data transfer.

16. A semiconductor device comprising:
 a die of a multi-die package comprising:
  encryption circuitry to receive data and to encrypt the data to generate encrypted data; and
  a connection interface to transmit the encrypted data over a die-to-die interconnect to a second die within the multi-die package.

17. The semiconductor device of claim 16, wherein the encryption circuitry is to encrypt the data based on metadata of a packet of the data.

18. The semiconductor device of claim 16, wherein the connection interface comprises a plurality of channels, and wherein the encrypted data is transmitted over the die-to-die interconnect by one of the plurality of channels, and wherein unencrypted data is transmitted over the die-to-die interconnect by a remainder of the plurality of channels.

19. A semiconductor device comprising:
 a die of a multi-die package comprising:
  a connection interface to receive encrypted data from a second die of the multi-die package via a die-to-die interconnect, wherein the encrypted data is encrypted on the second die in the multi-die package;

decryption circuitry to receive the encrypted data and to decrypt the encrypted data to generate decrypted data; and data utilization circuitry to utilize the decrypted data.

20. The semiconductor device of claim 19, wherein the data utilization circuitry comprises a processor to receive the decrypted data from the decryption circuitry.

* * * * *